Figure 1:
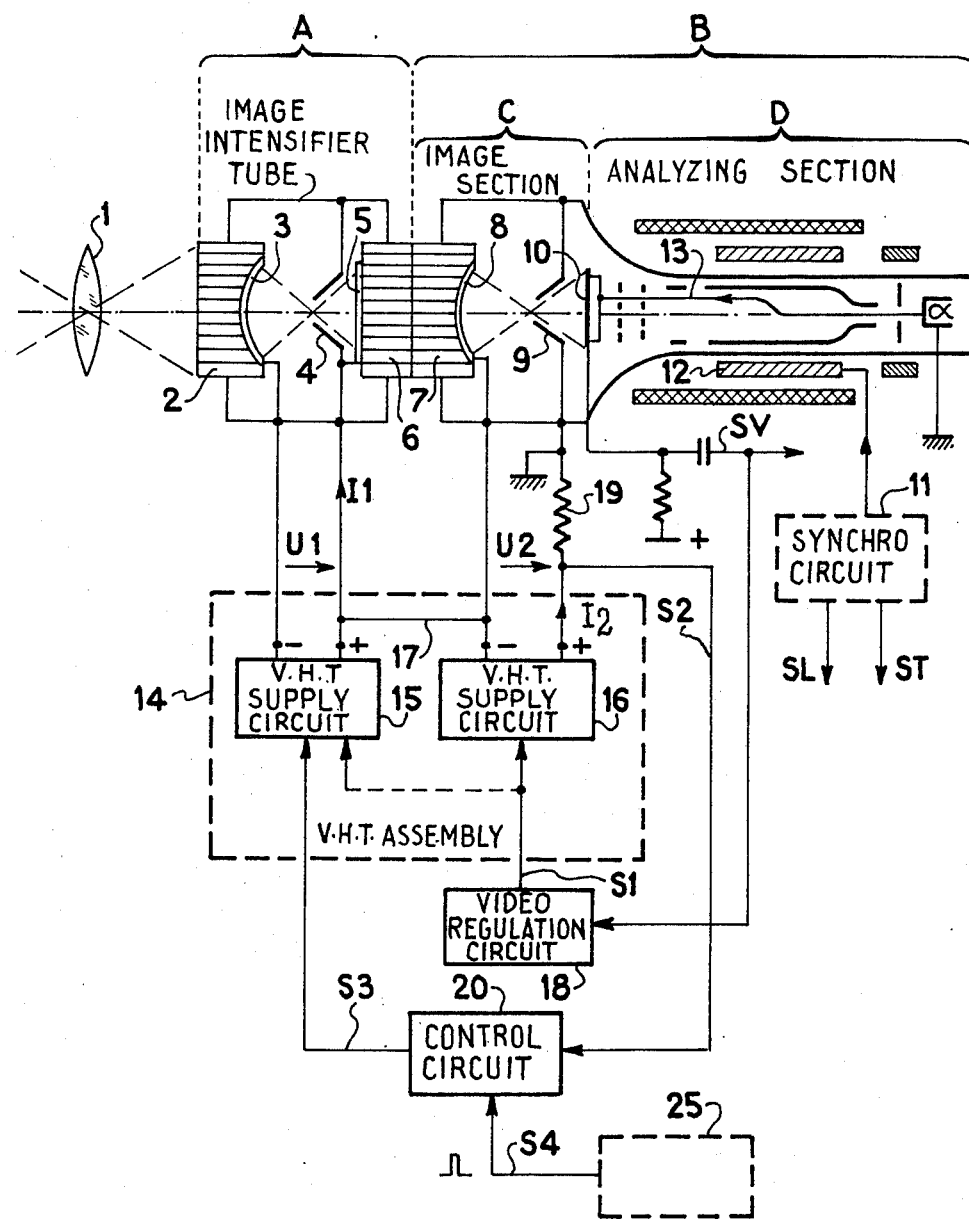

United States Patent [19]

Pepin

[11] 3,974,331

[45] Aug. 10, 1976

[54] LOW LIGHT LEVEL IMAGE PICK-UP TUBE ARRANGEMENT

[75] Inventor: Christian Pepin, Paris, France

[73] Assignee: Thomson-CSF, Paris, France

[22] Filed: May 6, 1974

[21] Appl. No.: 467,470

[30] Foreign Application Priority Data
May 9, 1973 France .................. 73.16739

[52] U.S. Cl. .................. 178/7.2; 178/DIG. 11;
250/213 VT; 178/DIG. 29
[51] Int. Cl.² .................................. H04N 5/34
[58] Field of Search ....... 178/7.2, DIG. 29, DIG. 11;
250/213 VT; 315/10

[56] References Cited
UNITED STATES PATENTS

| | | | |
|---|---|---|---|
| 3,553,363 | 1/1971 | Anderson .......................... | 178/7.2 |
| 3,612,762 | 10/1971 | Wuellner et al. .................. | 178/DIG. 29 |
| 3,691,302 | 9/1972 | Gaebele et al. ................... | 178/DIG. 29 |
| 3,694,659 | 9/1972 | Ramsay et al. .................. | 250/213 VT |
| 3,748,383 | 7/1973 | Grossman ........................ | 178/7.2 |
| 3,795,767 | 3/1974 | Waltner et al. .................. | 178/DIG. 11 |

*Primary Examiner*—Robert L. Richardson
*Attorney, Agent, or Firm*—Edwin E. Greigg

[57] ABSTRACT

A low light level image pick-up tube is protected from excessive illumination intensity damage by controlling a very high voltage assembly supplying the tube. The tube comprises in a preferred embodiment a plurality of image intensifier stages in cascade preceding an electron gun from which a video signal is provided by electronic scanning.

A mean level video regulation circuit provides from the video signal an output signal used for controlling the supply voltage value to at least one of the image intensifier stages including the last one i.e. that preceding the electron gun. Further, a signal proportional to the supply current to the last image intensifier stage is used for controlling the supply voltage value of the input image intensifier stage which receives focussed radiation from an observed field.

10 Claims, 3 Drawing Figures

LOW LIGHT LEVEL IMAGE PICK-UP TUBE ARRANGEMENT

The present invention relates to a low light level image pick-up tube arrangement. The invention applies more particularly to equipment comprising a pick-up tube or a television camera tube which is intended to operate with very limited ambient illumination in the visible range and possibly in the near infra-red range, the scene illumination possibly being equivalent to that produced by the residual night light.

Such arrangements are fitted in particular to industrial or military surveillance systems. As an example the arrangement may form part of a fire-control system so as to make possible night-time aiming and firing. In this type of application, which should not be looked upon as limiting, bright lights caused by firing appear in the field of view of the so-called "camera" device.

Owing on the one hand to the high ratio between the illumination produced by such extraneous sources and the ambient night-time light level, and on the other hand to the extreme sensitivity of the camera tube incorporated in the device, difficulties arise the seriousness of which depends on the brightness of the sources in question, the length of time for which they persist and the area which they occupy in the observed field.

Unless special steps are taken, there is a danger of the target of a low-light-level camera tube being suddenly saturated over the whole or part thereof when the scene illumination exceeds permitted limits; the tube will then take a fairly long time, perhaps several seconds, before it will again produce a normal image. In connection with this drawback of saturation, it should also be mentioned that, where the light energy received is even more excessive, there is a risk of the target being destroyed, for which there is no remedy. Furthermore, the camera tube may incorporate a light image intensifier stage having a luminescent screen the input of which receives the incident radiation through an optical focussing lens. In the case of too strong an illumination, persistence on the screen may be too long and this may result in the image being lost until this so-called "afterglow" effect ceases with the return to the normal persistence level.

It is therefore helpful to produce a circuit for protecting the tube against the effects of excessive illumination.

According to known techniques there is provided a regulating circuit which controls the very high voltage circuit supplying the tube of the camera device. This regulating circuit operates from a video signal obtained by scanning the target with a cathode ray and the video signal is processed by integration and then by differential comparison so as to produce a signal for controlling the very high voltage supply. The resulting variation in the very high voltage enables the mean level of the video signal to be stabilized at a predetermined value. Bearing in mind that integration has to take place over a period equivalent to the complete target being scanned several times, the response time of the regulation circuit is by no means negligible. When a sudden bright light occurs, it is thus impossible for the regulating circuit to react sufficiently fast to protect the tube against saturation and afterglow effects.

Another technique is used to suppress the traces called comet-tails which are left in the image by very bright moving points. This technique allows the turn-off time of the tube to be reduced but requires a specially made tube which contains special electrodes and correspondingly complex control circuits. Furthermore, no provision is made for dealing with instances where a considerable area, or even the whole, of the target is saturated.

The present invention provides a low-light-level pick-up tube arrangement in which means are provided to substantially reduce or overcome the phenomena of afterglow and saturation which result from sudden and bright ambient illumination.

According to a feature of the invention, there is provided a low light level image pick-up tube arrangement comprising: optical means for focussing radiation reveived from an observed field; and image pick-up tube for receiving the said focussed radiation and for delivering a video signal, the said pick-up tube comprising image intensifying means and electron gun means from which said video signal is derived by electronically scanning a target; very high voltage generating means for supplying the said image intensifier means; a mean level video signal regulation circuit receiving said video signal for providing a first control signal; and a control circuit receiving a signal proportional to the supply current of the said image intensifier means for providing a second control signal; said generating means comprising means for receiving said first and second control signals respectively and for controlling the magnitude of the supply signal which feeds said intensifier means.

Figure 2:
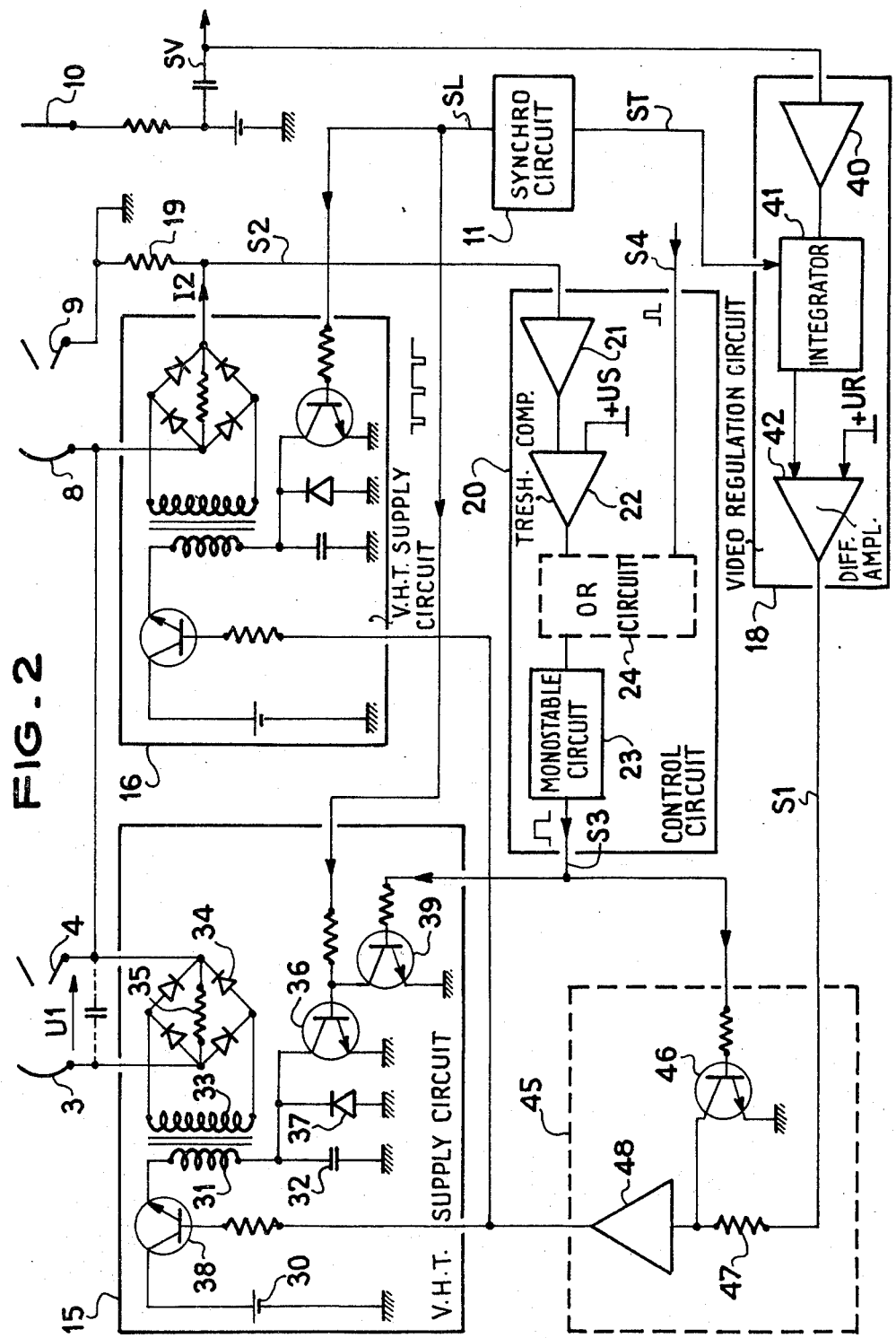
Figure 3:
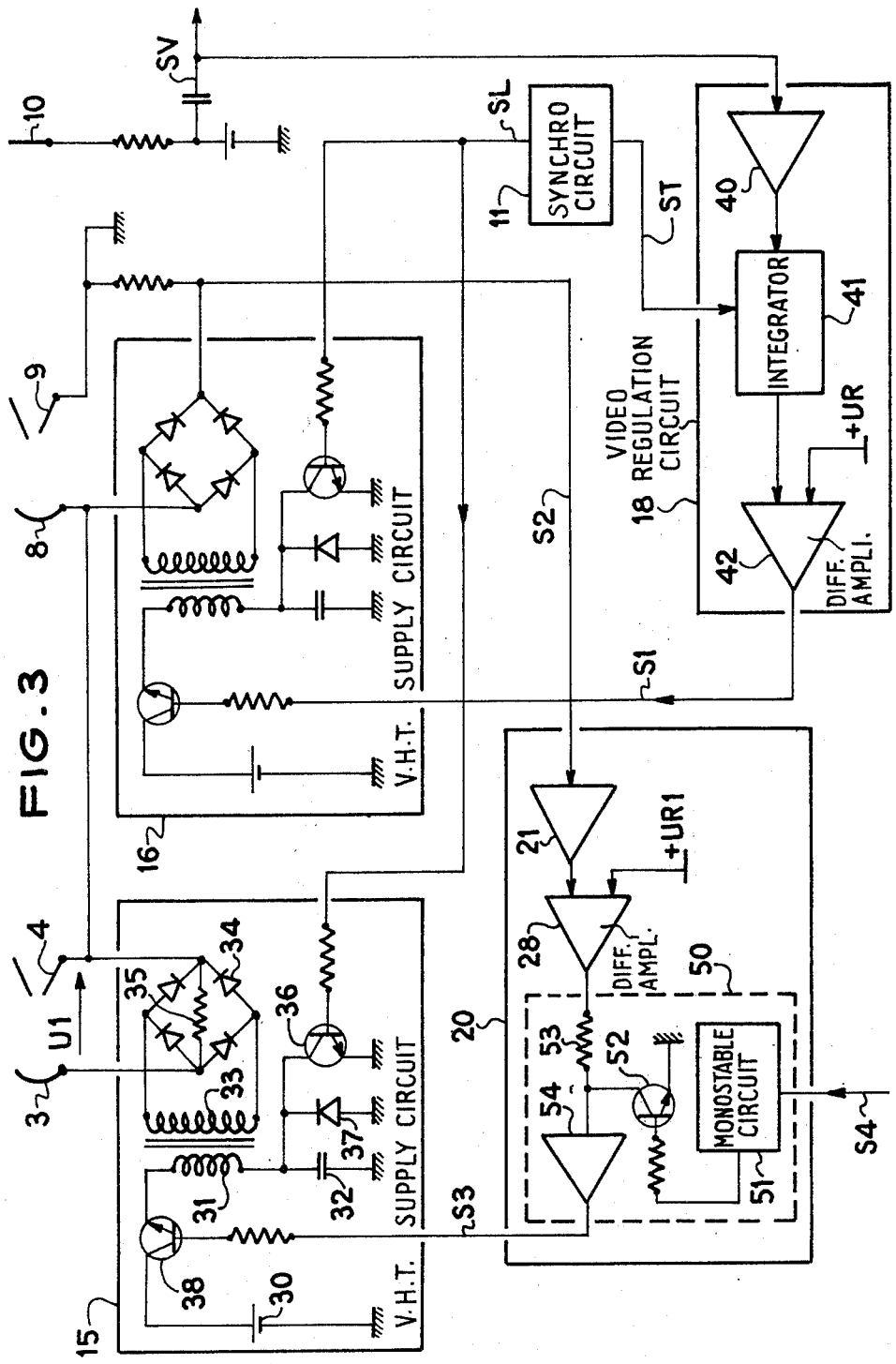

The invention will now be further described with reference to the accompanying drawings, in which components which are the same are indicated with the same reference numerals, and which show:

FIG. 1, a simplified diagram of a pick-up tube arrangement according to the invention, FIG. 2, a first embodiment of the arrangement according to FIG. 1, FIG. 3, a second embodiment of the arrangement according to FIG. 1.

The low-light-level pick-up tube arrangement shown in FIG. 1 contains an electronic camera which combines an optical lens and a pick-up or T.V. camera tube. The optical lens 1 focusses radiation from the observed field onto the input to the tube. The latter is of the very-high- sensitivity type which allows night vision and comprises in cascade, a first tube A of the image intensifier tube type followed by a second tube B. The tube B is of the type known under the trade marks "Esicon" or "Nocticon," the combination of A and B being known respectively as "Super-Esicon" or "Super-Nocticon." The second tube B comprises two sections, namely an image section C and an analysing section D. The image section C constitutes a second image intensifier stage and is arranged in a similar way to the image intensifier tube A so as to form an amplifier for electrostatic luminance. The analysing section D is substantially equivalent to a pick-up tube or a coventional television camera tube. The image intensifier tube A has an input window 2 formed from optical fibers, a photocathode 3, an anode 4, a luminescent screen 5 and an output window 6 made of optical fibres. The photocathode 3, which is applied to the input window 2, converts the light image into an electronic image. The emitted electrons, having been accelerated and suitably focussed, create a light image by bombarding a luminescent screen 5 arranged on the output window. Intensifier section C similarly contains an input window 7, a photocathode 8 and an anode 9. The electrons emitted by photocathode 8 are focussed onto a dielectric target 10 where they are multiplied locally without inertia and are collected by a signal electrode. The electron gun which forms the analyser section D restores the target to its initial state by means of a cathode-ray scan as in a television camera tube and thus generates the video signal current. The windings shown schematically on the outside of the gun are used to aim, focus and deflect the electron beam 13.

A scanning circuit 11 produces scan signals which are applied to deflector coils 12, the target usually being analysed in a line-by-line scan. Circuit 11 likewise produces the horizontal synchronizing signals SL and vertical synchronizing signals ST.

The very high voltage supply to tube A + B is provided by a very high voltage assembly 14 which produces a first voltage U1 which is applied between the photocathode 3 and anode 4 of the tube A which forms the first image intensifier stage, and a second voltage U2 which is applied between the photocathode 8 and anode 9 of the image section C which forms the second image intensifier stage. Anode 9 is connected to the earth reference potential and anode 4 is connected to the same potential as photocathode 8, namely a potential −U2 with respect to earth, photocathode 3 being at a potential − (U1 + U2) with respect to earth. Screen 5 is connected directly to cathode 4.

The very high voltage assembly 14 comprises two separate supply circuits 15 and 16 which supply image intensifier stages A and B respectively. A connection 17 between the positive terminal of the first circuit 15 and the negative terminal of the second circuit 16 ensures that electrodes 4 and 8 are at the same potential. As will become apparent later, separating the supply circuits makes it possible for the gains of the appropriate intensifier stages A or c to be adjusted individually by altering their supply voltages.

The arrangement includes a regulating circuit 18 of the type mentioned above which enables the mean level of the video signal SV generated by scanning target 10 to be stabilized.

Furthermore, the arrangement incorporates a circuit 20 which controls the supply voltage U1 to image intensifier tube A as a function of the supply current I2 to the image intensifier stage C of tube B. A signal S2 proportional to the current drawn from the very high voltage source 16 is created by the voltage at the terminals of a resistive member 19 which is connected in series between the positive terminal of circuit 16 and earth in the connecting line to the anode. Signal S2 is transmitted to the input of control circuit 20, which generates a signal S3 applied to circuit 15. Supply circuit 15 is arranged to cause voltages U1 to alter in the desired direction when control signal S3 is received. In the present case this alteration represents a decrease in the value of U1, the purpose of which is to reduce I2 accordingly and thus prevent saturation and afterglow phenomena.

The critical level of current I2 at which saturation phenomena occur is established beforehand on the basis of the tube characteristics and, if applicable, by taking into account the conditions under which excess illumination may occur where these are predictable in advance. Current I2 is equivalent to the supply current I1 to tube A multiplied by the gain of stage A, and current I1 is of course directly related to the light level incident on input window 2. Signal S2 thus immediately reflects any variation in the scene illumination which may occur in the observed field.

Two types of embodiments are envisaged. In a first embodiment, control circuit 20 brings about "all or nothing" operation. As soon as current I2 reaches the predetermined critical level, signal S3 causes a practically instantaneous drop in voltage U1, (which way amount to its being reduced to zero) so as to render intensifier stage A inoperative, this condition being then maintained for a predetermined length of time. For this length of time, stage A forms an obturator, similar to an opaque screen or mask, to incident radiation. In a second embodiment circuit 20 operates as a regulator for current I2 by holding it at a normal operating level by altering voltage U1. In this case, stage A forms a partial obturator similar to an adjustable diaphragm. Except for the time constant of the control circuit, the partial obturation effect takes place synchronously with changes in illumination. Whichever embodiment is employed, the time constant in question may be made very short and may be of the order of 1 millisecond, for example.

In addition control circuit 20 is so arranged that it is capable of substituting an external signal S4 for the local signal S2 and, as soon as this signal S4 is received of causing the effect of complete obturation by the intensifier tube A. Signal S4 represents the phenomenon of a strong light occurring in the field of observation, as foreseen. As an example, where the application is to a fire-control system, signal S4 is the firing order signal which precedes the actual discharge and the appearance of flames from weapons in the field of view. This signal S4 is produced by ancillary means incorporated in the system, which are shown schematically by a block 25 in FIG. 1.

FIG. 2 shows an embodiment of the first type described. The very high voltage supply circuit 15 comprises a low voltage D.C. source intended to supply an oscillatory LC circuit formed by the primary winding 31 of a step-up transformer in series with a capacitor 32. The secondary winding 33 of the transformer feeds a first diagonal of a rectifier bridge 34 which includes a resistive member 35 across its second diagonal. A transistor 36, which is connected as a switch and which is protected by a diode 37 causes capacitor 32 to be short-circuited in sequence. For this purpose, the base of transistor 36 receives the horizontal synchronizing signal SL from circuit 11. Signal SL causes the transistor to be blocked for the duration of each negative horizontal synchronizing pulse, the transistor being conductive during each interval between two successive synchronizing pulses. Resistor 35 is such that, in conjunction with the residual capacitance of tube A, it forms an RC circuit the time constant of which is sufficiently short to allow the voltage U1 at the terminals of the intensifier stage to alter quickly.

The video regulation circuit 18 may act on the supply circuit by means of a transistor 38 inserted between the D.C. source 30 and winding 31, the transistor in question being controlled from its base and being substantially equivalent to a variable resistive impedance in series with the source.

The components 30 to 38 which make up circuit 15 are used in the same way to form the second supply circuit 16 shown, regulation circuit 18 acting on circuits 15 and 16 simultaneously in this first embodiment. It is understood that the type of supply circuit shown is not to be considered as limiting. Furthermore, circuit 16 may be differently designed from circuit 15 and may, for example incorporate diode cells and voltage-multiplying resistors in a known way.

Regulating circuit 18 comprises an amplifier 40, an integrator 41 and a differential amplifier 42 in series. The video signal SV which is amplified at 40 is integrated at 41 for a certain number of frame periods, and for this purpose integrator circuit 41 may receive the frame synchronizing signal ST from circuit 11. The result of integration is compared with a reference voltage level UR in circuit 42 and this circuit supplies the signal S1 for controlling transistor 38. Level UR is calculated on the basis of the required mean video level.

Control circuit 20 comprises, in series, an amplifier 21 which receives signal S2, a comparison circuit 22 the threshold voltage level of which is US, and a monostable circuit 23. The threshold US is calculated to allow monostable circuit 23 to trigger as soon as current 12 reaches the critical level. Circuit 23 then gives out a pulse S3 of predetermined length. This pulse S3, which is shown as a positive pulse in the Figure, acts on the base of a transistor 39 in supply circuit 15. Transistor 39 is connected via its other electrodes across the base and emitter of transistor 36 and operates as a switch. It is normally in the open state and closes when signal S3 is received. The base of transistor 36 is thereby connected to earth and the transistor remains in the blocked state while signal S3 persists and prevents oscillations from occurring for the whole of this period of time. The result is that voltage U1 quickly drops below the operating threshold of intensifier tube A and as soon as this happens the first image intensifier tube forms a complete obturation. The duration of signal S3 is determined by the components used to form monostable circuit 23 and it is fixed beforehand as a function of the time for which the obturation is to exist in the envisaged application.

External control by means of signal S4 is achieved by means of a circuit 24 connected between comparator 22 and monostable circuit 23. This circuit may, for example, consist of an OR circuit having two inputs, one of which receives the output signal from the comparator 22 and the other of which receives signal S4.

Circuit 45 is an optional circuit whose connection between 18 and 38 is justified if the integration period of circuit 41 is short in comparison with the duration of signal S3 or is of the same order of magnitude. When this is the case, there is a danger of control circuit 18 producing hunting phenomena when it operates. Consequently, it is helpful to prevent circuit 18 from operating while signal S3 persists. For this purpose, circuit 45 contains a transistor 46 which operates as a normally open switch. When S3 is received, transistor 46 goes to the open or conductive state and connects to earth the input of an amplifier circuit 48 which normally receives signal S1 via a resistive member 47. As a consequence the impedance offered by transistor 38 becomes a maximum.

FIG. 3 relates to an embodiment equivalent to the second mode of operation mentioned. The output S1 of regulating circuit 18 controls only supply circuit 16. Transistor 38 is controlled by the output signal S3 from a control circuit 20 which contains amplifier 21 and a differential comparator circuit 28. Once amplified, signal S2 is compared to a reference voltage level UR1. The level of UR1 is such that current level 12 is equivalent to the normal ambient illumination anticipated. Signal S4 is allowed to exert external control by means of a circuit 50 interposed in the connection between 28 and 38 which combines a monostable circuit 51 which prolongs signal S4 and a circuit comprising members 52, 53 and 54 which is similar to circuit 45 in FIG. 2. Since the impedance of transistor 38 becomes a maximum as soon as signal S4 is received, the corresponding voltage U1 drops to a minimum value for the time during which this signal persists.

The description which has been given relates to an arrangement incorporating a very high sensitivity television camera tube which allows night vision. It is understood that the arrangement may comprises a tube less sensitive which does not include the image intensifier stage A (FIG. 1). When this is the case, the supply circuit controlled by control circuit 20 is reduced to circuit 16 (FIG. 1), the embodiment then preferably taking the form described with reference to FIG. 2 (circuits 18-20-45 and 15) so as not to break the chain through which the mean video level is regulated. It is likewise understood that the tube arrangement may have more than two image intensifier stages. The invention is equally applicable to a night-viewer device formed by an optical lens followed by image intensifier tubes connected in cascade.

When a conventional tube is used, the arrangement described prevents any loss of image caused by the camera being dazzled, this loss of image resulting from the target of the electron gun being saturated and/or by persistence at the luminescent screen of the first image intensifier stage.

Of course, the invention is not limited to the embodiment described and shown which was given solely by way of example.

What is claimed is:

1. A low light level image pick-up tube arrangement comprising: optical means for focussing radiation received from an observed field; an image pick-up tube for receiving the said focussed radiation and for delivering a video signal, the said pick-up tube comprising image intensifying means which include a plurality of image intensifier stages in cascade, and electron gun means from which said video signal is derived by electronically scanning a target; very high voltage generating means for supplying said intensifier stages with supply voltages respectively; a mean level video signal regulation circuit receiving said video signal for providing a first control signal; said first control signal providing through said generating means a variation of the supply voltage to at least one of the said image intensifier stages including the last one i.e., that preceding the said electron gun means, and, a control circuit receiving a signal proportional to the supply current of the said last image intensifier stage for providing a second control signal, said second control signal providing through said generating means a variation of the supply voltage to the input image intensifier stage; said generating means comprising means for receiving said first and second control signals respectively and for controlling the magnitude of the supply voltages which feed said intensifier means.

2. An arrangement according to claim 1, wherein the control circuit contains means for receiving an external control signal and which enables the gain of the input image intensifier stage to be reduced to zero for a predetermined length of time when the said external control signal is received.

3. An arrangement according to claim 2, wherein the control circuit contains, for the purpose of reducing the gain of the input image intensifier stage to zero, a threshold comparator circuit in series with a monostable circuit which supplies the said second control signal.

4. An arrangement according to claim 3, wherein the said means in the control circuit comprise a 2-input OR circuit which is connected by one input and its output between the comparator circuit and the monostable circuit, its second input receiving the said external control signal.

5. An arrangement according to claim 2, wherein the control circuit contains, for the purpose of making the gain of the input image intensifier stage variable, a differential comparator circuit which supplies the said second control signal.

6. An arrangement according to claim 5, wherein the said means in the control circuit comprise a switch circuit which is connected to the output of the differential comparator circuit and a monostable circuit which receives the said external control signal and the output of which controls the said switch circuit.

7. An arrangement according to claim 2, wherein the supply generating means comprises a plurality of separate supply circuits the number of which is the same as that of the image intensifier stages with which they are respectively associated to provide an appropriate very high voltage supply, the said second control signal being applied to the supply circuit for the input image intensifier stage and the said first control signal being applied to at least the supply circuit for the last image intensifier stage.

8. An arrangement according to claim 7, and comprising two image intensifier stages, wherein the first control signal is supplied simultaneously to the two supply circuits, each supply circuit containing a resistive circuit the resistance value of which may be altered by applying the said first control signal, the supply circuit for the input image intensifier stage comprising a switch circuit which is controlled by the said second control signal.

9. An arrangement according to claim 7, and comprising two image intensifier stages, wherein the first control signal is applied to the supply circuit for the second image intensifier stage, this circuit comprising a resistive circuit the resistance value of which may be altered by applying the said first control signal, the supply circuit for the input image intensifier stage comprising a resistive circuit the resistance of which may be varied by applying the said second control signal.

10. An arrangement according to claim 7, and fitted in a night-firing control system which comprises means for generating a firing control signal which forms the said external control signal.

* * * * *